(12) United States Patent
Fernengel et al.

(10) Patent No.: US 10,116,248 B2
(45) Date of Patent: Oct. 30, 2018

(54) METHOD AND DEVICE FOR OPERATING A BRUSHLESS MOTOR

(75) Inventors: Mathias Fernengel, Dietzenbach (DE); Christian Heyer, Wallhausen (DE)

(73) Assignee: Continental Automotive GmbH, Hannover (DE)

( * ) Notice: Subject to any disclaimer, the term of this patent is extended or adjusted under 35 U.S.C. 154(b) by 398 days.

(21) Appl. No.: 14/122,156

(22) PCT Filed: May 23, 2012

(86) PCT No.: PCT/EP2012/059592
§ 371 (c)(1),
(2), (4) Date: Feb. 11, 2014

(87) PCT Pub. No.: WO2012/160090
PCT Pub. Date: Nov. 29, 2012

(65) Prior Publication Data
US 2014/0184117 A1 Jul. 3, 2014

(30) Foreign Application Priority Data
May 26, 2011 (DE) .................. 10 2011 076 510

(51) Int. Cl.
*H02P 6/14* (2016.01)
*H02P 6/16* (2016.01)
(Continued)

(52) U.S. Cl.
CPC ............ *H02P 29/00* (2013.01); *B62D 5/0484* (2013.01); *B62D 5/0487* (2013.01);
(Continued)

(58) Field of Classification Search
CPC ...... H02H 7/0833; H02H 7/093; H02P 6/142; H02P 6/145
See application file for complete search history.

(56) References Cited

U.S. PATENT DOCUMENTS 4,250,435 A  2/1981 Alley
5,339,235 A * 8/1994 Shekhawat et al. ............ 363/43
(Continued)

FOREIGN PATENT DOCUMENTS

DE  102004023713     12/2004
DE  102005001703 A1  2/2006
(Continued)

OTHER PUBLICATIONS

Hamid A. Toliya, Gerald B. Kliman, Handbook of Electric Motors, 2004, CRC Press, Second Edition, p. 488.*
(Continued)

*Primary Examiner* — Bickey Dhakal
*Assistant Examiner* — Charles S Laughlin
(74) *Attorney, Agent, or Firm* — RatnerPrestia

(57) ABSTRACT

A method and device for operating a brushless electric motor, having windings controlled by an inverter using six switches. The inverter includes three outputs that are associated with the windings of the electric motor. A respective power semiconductor switch is arranged between the outputs of the inverter and the windings, and wherein a detection unit detects defective switches, a measuring unit measures the voltage at the outputs of the inverter, and a motor angle position sensor determines the motor angle position arc. The invention further relates to a device for operating a brushless electric motor. The inverter is switched off after a defective switch has been detected, such that no additional power is introduced in the windings of the electric motor. The motor angle position sensor consecutively opens the power semiconductor switches in a predetermined motor angle position.

10 Claims, 5 Drawing Sheets

(51) Int. Cl.

| | |
|---|---|
| *H02P 29/04* | (2006.01) |
| *H02P 29/00* | (2016.01) |
| *H02H 7/122* | (2006.01) |
| *B62D 5/04* | (2006.01) |
| *H02P 6/24* | (2006.01) |
| *H02P 29/024* | (2016.01) |
| *H02H 7/08* | (2006.01) |

(52) U.S. Cl.
CPC ............ *H02H 7/1225* (2013.01); *H02P 6/24* (2013.01); *H02P 29/0241* (2016.02); *H02H 7/0838* (2013.01)

(56) References Cited

U.S. PATENT DOCUMENTS

| | | | | |
|---|---|---|---|---|
| 5,373,206 | A * | 12/1994 | Lim | ........................ H02K 29/06 |
| | | | | 310/68 B |
| 5,446,354 | A | 8/1995 | Hiruma | |
| 5,473,241 | A | 12/1995 | Chen | |
| 6,153,993 | A * | 11/2000 | Oomura et al. | ............... 318/434 |
| 6,807,038 | B2 | 10/2004 | Iwagami | |
| 7,161,323 | B2 * | 1/2007 | Ajima et al. | ................... 318/629 |
| 7,723,938 | B2 * | 5/2010 | Tsuji et al. | ..................... 318/432 |
| 8,941,337 | B2 | 1/2015 | Uryu | |
| 2002/0047683 | A1 | 4/2002 | Kawashima | |
| 2004/0228050 | A1 * | 11/2004 | Recker | ................. B62D 5/0484 |
| | | | | 361/23 |
| 2004/0257018 | A1 | 12/2004 | Tobias | |
| 2006/0056206 | A1 * | 3/2006 | Kifuku et al. | ................... 363/15 |
| 2007/0040532 | A1 * | 2/2007 | Bae et al. | ..................... 318/801 |
| 2008/0211439 | A1 * | 9/2008 | Yokota | .................. G01R 31/343 |
| | | | | 318/400.21 |
| 2009/0032327 | A1 | 2/2009 | Yasuda | |
| 2009/0079371 | A1 | 3/2009 | Suzuki | |
| 2009/0295313 | A1 | 12/2009 | Suzuki | |
| 2010/0017063 | A1 | 1/2010 | Maeda | |
| 2010/0060222 | A1 | 3/2010 | Kezobo | |
| 2010/0079093 | A1 * | 4/2010 | Kitanaka | ................. B60L 3/003 |
| | | | | 318/400.3 |
| 2012/0086372 | A1 | 4/2012 | Henke | |

FOREIGN PATENT DOCUMENTS

| | | |
|---|---|---|
| DE | 102007024659 | 11/2008 |
| DE | 102010001241 | 10/2010 |
| DE | 102010037541 A1 | 3/2011 |
| WO | 03099632 | 12/2003 |
| WO | WO 2012160092 A2 | 11/2012 |

OTHER PUBLICATIONS

Handbook of Electric Motors, Toliyat and Kliman, 2004, p. 488.*
International Search Report dated May 24, 2013 for PCT/EP2012/059592.
Entire patent prosecution history of U.S. Appl. No. 14/119,518, filed Nov. 22, 2013, entitled, "Method and Device for Operating a Brushless Motor."
International Search Report corresponding to application No. PCT/EP2012/059594 dated Jun. 20, 2013.
Notice of Allowance dated Dec. 18, 2015 for U.S. Appl. No. 14/119,518.

* cited by examiner

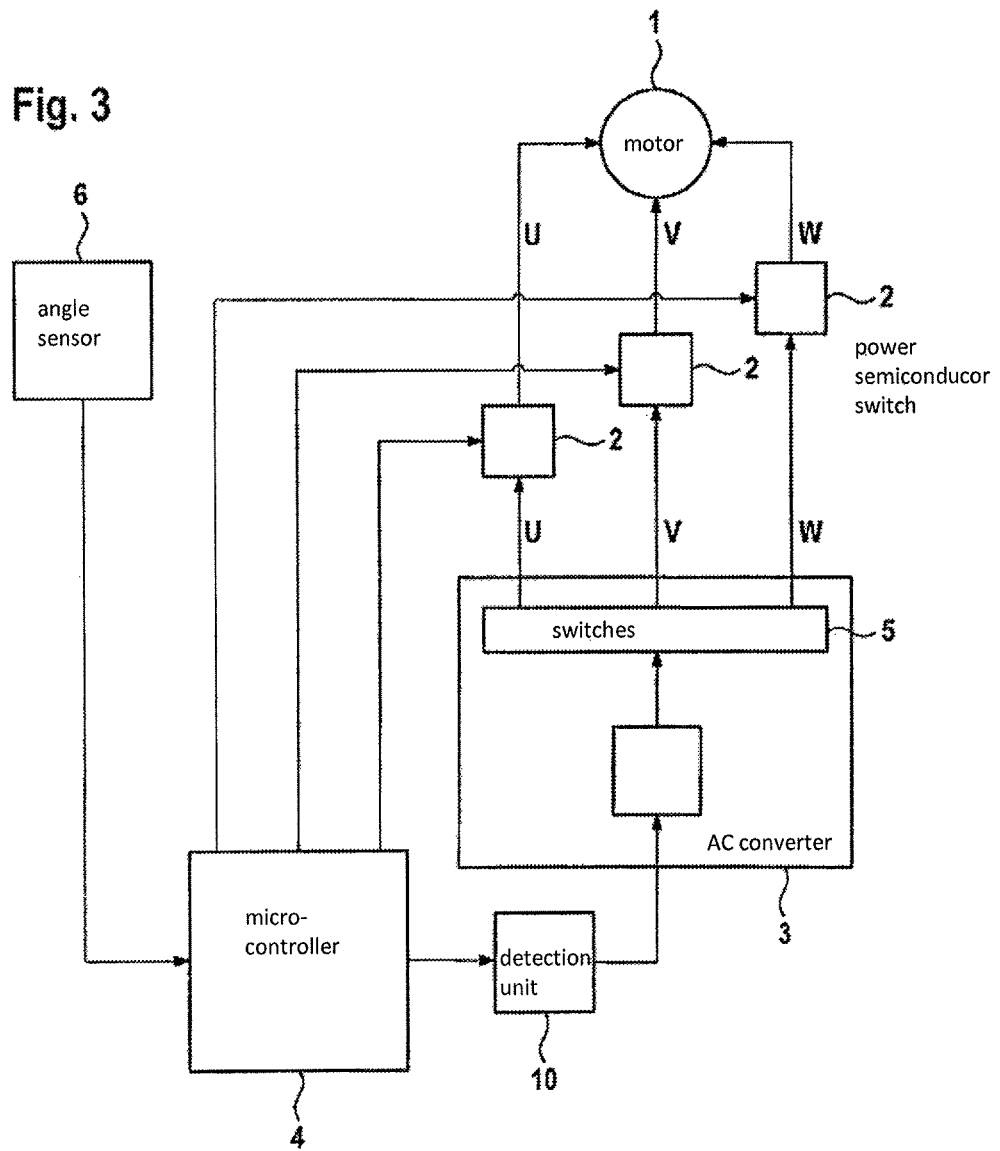

METHOD AND DEVICE FOR OPERATING A BRUSHLESS MOTOR

CROSS-REFERENCE TO RELATED APPLICATIONS

This application is a U.S. National Stage application of International Application No. PCT/EP2012/059592, filed May 23, 2012, which claims priority to German Application No. 10 2011 076 510.7, filed May 26, 2011, the contents of such applications being incorporated by reference herein.

FIELD OF THE INVENTION

The present invention relates to a method for operating a brushless electric motor, the windings of which are controlled by an AC converter with the aid of six switches, wherein the AC converter comprises three outputs that are allocated to the windings of the electric motor and wherein a power semiconductor switch is arranged in each case between the outputs of the AC converter and the windings and wherein a detection unit for detecting defective switches, a unit for measuring the voltage at the outputs of the AC converter and a motor position angle sensor for determining the motor position angle is provided. The present invention further relates to a device for operating a brushless electric motor.

BACKGROUND OF THE INVENTION

AC converters for controlling brushless motors generally comprise six switches. In the event of a defect, each switch can comprise in principle two different characteristics: non-conductive, in other words in the opened switching position, the switch performs a blocking function; or conductive, in other words in the closed switching position, the switch performs a blocking function. A conductively defective switch is also colloquially known as a short circuit. It is then particularly important in applications where safety is concerned to switch the electric motor very quickly into an emergency mode or to switch said electric motor off immediately.

In contrast to mechanical relays, the use of power semiconductor switches is encumbered with the disadvantage that as inductive loads are switched off, depending on the magnitude of the load current and of the inductivity of the load, it is possible to release a quantity of energy of such a magnitude that the power semiconductor switch is destroyed at the moment an inductive load is switched off and as a consequence said power semiconductor switch can no longer fulfill its role. It is necessary to avoid damage to the power semiconductor switches, especially when using power semiconductor switches for brushless motors in applications where safety is critical and where it is necessary to switch off the motor in the power circuit in order to provide a protective function. One application where safety is critical is the use of a brushless electric motor in an electromechanical steering arrangement of a motor vehicle.

For applications of this type where the inductive energy in the load circuit exceeds the admissible absorption capability of a power semiconductor switch, it is known to use instead a mechanical relay that owing to its construction comprises a considerably greater absorption capability in comparison with power semiconductor switches currently available on the market. Although the mechanical relay boosts the switching-off energy which inevitably occurs when switching inductive loads under current, and can therefore be activated at any time, it has very severe availability problems as a mechanical system. A further possibility resides in diverting the amount of energy that arises whilst switching off an inductive load into an energy sink such as by way of example a suppressor diode that relieves the load on the power semiconductor switch.

SUMMARY OF THE INVENTION

An aspect of the present invention provides a method and a device wherein damage to the semiconductor switches is reliably avoided whilst switching off inductive loads.

This is achieved by virtue of the features of the independent claims. The AC converter is switched off following the detection of a defective switch in such a manner that power is no longer introduced into the windings of the electric motor and that the motor position angle sensor opens the power semiconductor switches in succession at a previously defined motor position angle.

Advantageous developments are evident in the subordinate claims.

It follows from this, that it is provided in a preferred embodiment of the method in accordance with the invention that the motor position angles are allocated in each case to a winding and to the power semiconductor switch thereof and are selected in such a manner that the allocated power semiconductor switches are not damaged during the opening process. For this purpose, the motor position angles are selected so that the drain current prevailing at the power semiconductor switches is zero, almost zero or negative.

It is provided that the instantaneous values of the drain currents that allow inductive loads to be switched off without damaging the power semiconductor switches is deterministically dependent upon the motor angle, which instantaneous values are prevailing in the the at the power semiconductor switches. It is significant that it is not absolutely necessary for the method to monitor the phase currents directly using measuring technology, because the information required for the purpose can be drawn from the measured motor angle.

The said object is also achieved by means of a device in which the AC converter is switched off by the microcontroller after the detection of a defective switch in such a manner that power is no longer introduced into the windings of the electric motor and that the motor position angle sensor is designed as to open the power semiconductor switches in succession in a previously determined motor position angle.

In a particularly advantageous development of the subject matter of the invention, the motor position angle sensor is designed so as to allocate the motor position angles in each case to a winding and the power semiconductor switch of said winding and to select said motor position angles so that the allocated power semiconductor switches are not damaged during the opening process. The motor position angle sensor is designed so as to select the motor position angles so that the drain current that is prevailing at the power semiconductor switches is zero, almost zero or negative.

It is provided that the power semiconductor switches are embodied as power MOSFET transistors.

A further advantageous development of the subject matter of the invention provides that the unit for detecting defective switches and the unit for measuring the voltage at the outputs of the AC converter are integrated into the microcontroller.

BRIEF DESCRIPTION OF THE DRAWINGS

The invention is further explained hereinunder using two exemplary embodiments in connection with the attached drawing. In the drawing:

FIG. 3 illustrates a schematic diagram corresponding to FIG. 1 in accordance with the prior art.

DETAILED DESCRIPTION OF THE PREFERRED EMBODIMENTS

Figure 1:
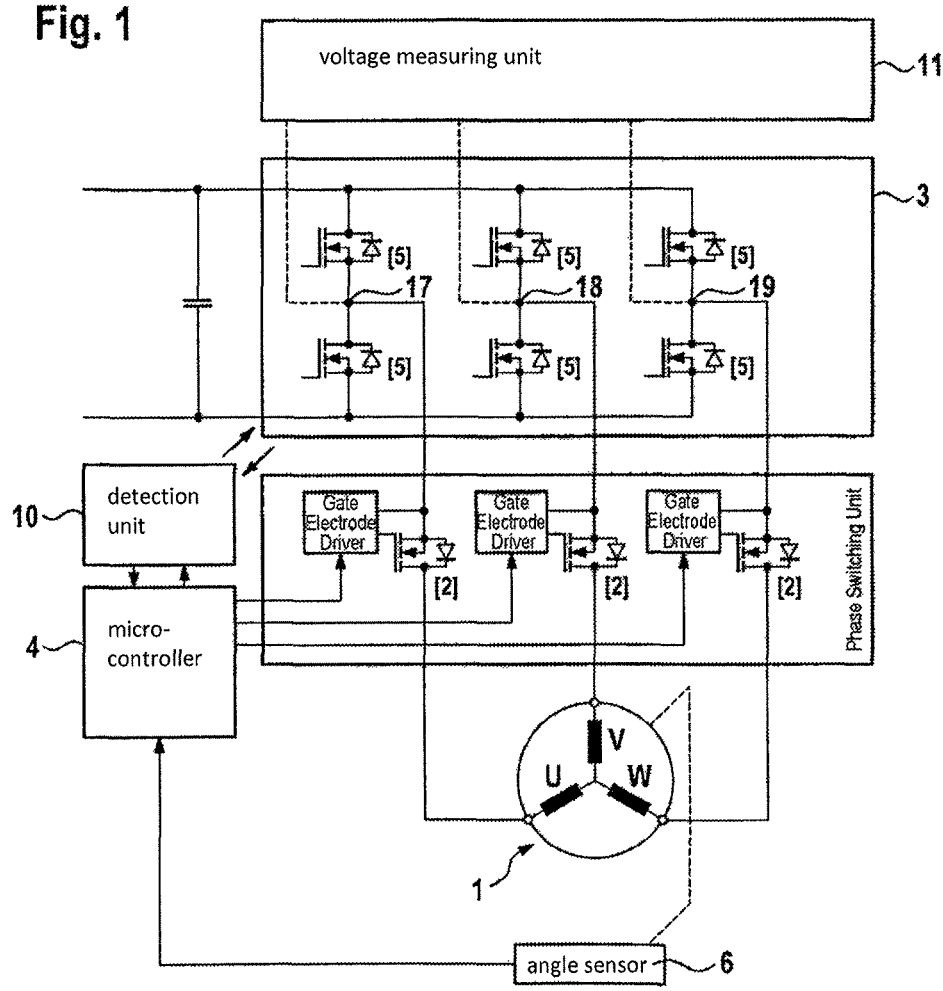
FIG. 1 illustrates a schematic diagram of the windings of a brushless electric motor and of an AC converter in accordance with the prior art.

FIG. 1 illustrates schematically a brushless electric motor 1, the windings U, V, W of which are controlled by means of an AC converter 3. For this purpose, the AC converter 3 comprises six switches 5, wherein the upper switches 5 in FIG. 1 are allocated to the positive supply voltage and the lower switches 5 in FIG. 1 are allocated to the negative supply voltage. As is further evident from FIG. 1, voltage tapping points 17, 18, 19 are located between the upper switches 5 that are allocated to the positive supply voltage, and the lower switches 5 that are allocated to the negative supply voltage, at which voltage tapping points the voltage prevailing at the windings U, V, W is tapped and said voltage is supplied to a unit 11 that is provided for measuring the voltage. The measurement results from the unit 11 that is provided for measuring the voltage are supplied to a microcontroller 4 that on the one hand controls the switches 5 and on the other hand evaluates the information produced by the unit 11 that is provided for measuring the voltage. In addition, a detection unit 10 is provided for detecting defective switches 5. The information produced by the detection unit 10 is likewise supplied to the microcontroller 4 for evaluation. Power semiconductor switches 2 are arranged in the phase lines that lead to the windings U, V, W.

In one embodiment in practice, the switches 5 are formed by means of semiconductor switches and/or transistors or MOSFET transistors. In practice, the detection unit 10 is embodied as a bridge driver and applies a voltage to the switches 5 that are embodied as transistors and said detection unit verifies whether the switching position of the transistor changes. In practice, the unit 11 that is provided for measuring the voltage at the voltage tapping points 17, 18, 19 is embodied as a voltage divider and determines the duty cycle of a pulse-width-modulated voltage. The duty cycle corresponds to the quotient resulting from the pulse duration and the period duration.

Each switch 5 can in principle comprise two different types of a defect or rather in the event of a defect, each switch can essentially be located in one of the two subsequently described states: non-conductively defective, in other words in the opened switching position, the switch performs a blocking function; or conductively defective, in other words in the closed switching position, the switch performs a blocking function. A conductively defective switch 5 is also colloquially known as a short circuit.

It is particularly important in applications where safety is concerned such as in an electromechanical steering device to switch the electric motor 1 very quickly into an emergency mode or to immediately switch said electric motor off. The malfunction of the conductively defective switch 5 leads to an increased steering torque since in the event of a defect the driver of the vehicle moves the electric motor 1 in the generator mode and induces a current that immediately counteracts the steering movement at the steering wheel. This torque that counteracts the rotation direction of the driver of the vehicle is subsequently known as braking torque. A braking torque that is dependent upon the rotational speed is generated in a permanently excited synchronous machine by virtue of the short circuit in the AC converter 3. A conductively defective switch 5 causes a short circuit to occur across the motor windings U, V, W as a result of induction.

The phase connectors of the electric motor 1 are connected to the outputs of the driving AC converter 3 by way of the power semiconductor switches 2 for the purpose of using the brushless electric motor 1. The purpose of this arrangement is to de-energize the electric motor 1 in the event of a defect in the AC converter 3 and to consequently disconnect said electric motor from the previously described braking torque. This is also described as a safety shutdown. After a defect in the AC converter 3 is detected by the microcontroller 4, the AC converter 3 is initially switched off, in other words, the switches 5 are opened so that power is no longer introduced into the electric motor 1. If the electric motor 1 is still in its rotating state either by means of inertia or by means of drive from outside, a current peak periodically builds up within the AC converter 3 by means of the rectification of the induction voltage of the electric motor 1 by way of parasitic diodes and a switch 5 that is assumed to be conductively defective, said current peak generating the undesired braking torque. The process of switching off the power semiconductor switches 2 in the phase lines prevent this. In order to prevent damage to the power semiconductor switches 2 as a result of an inadmissibly high inductive amount of energy from the electric motor 1, said power semiconductor switches are switched off individually in windows of defined motor position angles $\varphi_U$, $\varphi_V$, $\varphi_W$, as a result any current flowing through the respective affected winding U, V, W is not damaging for the allocated power semiconductor switch 2. The power semiconductor switches 2 are embodied as power MOSFET transistors and short-term values of the drain current $I_D$ of zero, negative or low positive are not damaging. It is a characteristic of this method that the suitable motor position angle windows $\varphi_U$, $\varphi_V$, $\varphi_W$ always remain constant regardless of the position of the conductively defective switch 5 in the AC converter 3 and only depend on the rotation direction of the electric motor 1. It is thus sufficient to switch off the individual power semiconductor switches 2 in a purposeful manner by means of the detection of the admissible motor position angle windows $\varphi_U$, $\varphi_V$, $\varphi_W$ by the microcontroller 4. The motor position angle $\varphi_U$, $\varphi_V$, $\varphi_W$ is detected with the aid of a motor position angle sensor 6. It is necessary to detect the motor position angle $\varphi_U$, $\varphi_V$, $\varphi_W$ in order to control a brushless electric motor 1. An additional sensor is consequently not necessary in order to implement the method described here.

As previously mentioned, the suitable motor position angle windows $\varphi_U$, $\varphi_V$, $\varphi_W$ are not dependent upon the position of the conductively defective switch 5 in the AC converter 3. The suitable motor position angles $\varphi_U$, $\varphi_V$, $\varphi_W$ in fact remain constant. This correlation is illustrated in FIG. 2.

Figure 2A:
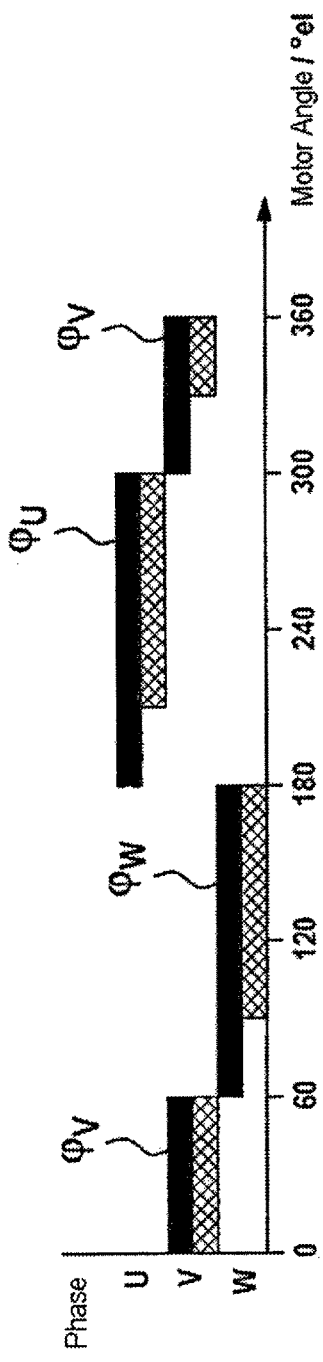
FIG. 2a illustrates a diagram having motor position angles for switching off the allocated power semiconductor switch in the case of a positive rotation direction of the electric motor.
Figure 2B:
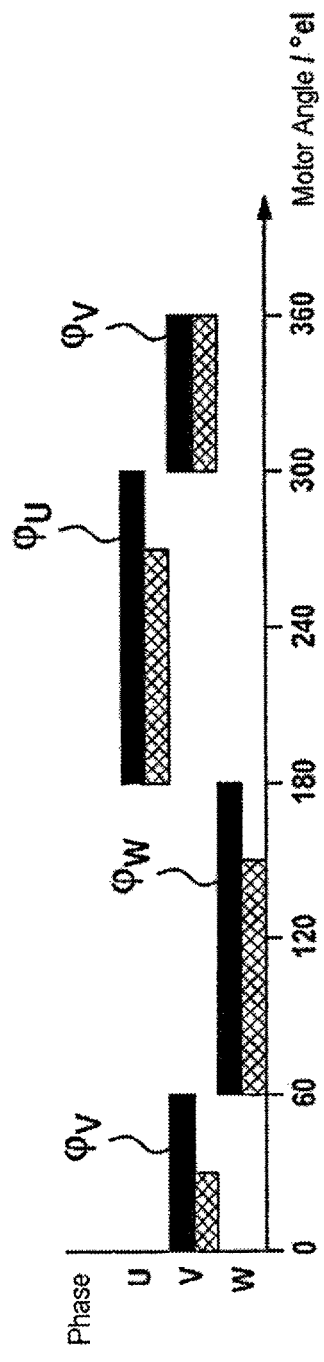
FIG. 2b illustrates a diagram having motor position angles for switching off the allocated power semiconductor switch in the case of a negative rotation direction of the electric motor.

In the case of a three phase BLDC motor, the motor position angle windows, in which the currents that are generated by means of the induced voltages and are caused by a conductively defective switch 5 in the AC converter 3 are zero in the individual phases, are theoretically up to 120° wide. If the motor angle is defined as φ=0° at the point where the induced voltage of the motor 1, which is driven from the outside, of the phase U is at its maximum, the de-energized angle windows lie for the three phases in the intervals $\varphi_U$=[300°; 60°], $\varphi_V$=[60°; 180°] and $\varphi_W$=[180°; 300°]. These values apply for idealized ratios, in which the electrical time period TPER=1/(N*number of pole pairs) that occurs by virtue of the mechanical rotational speed N of the motor remains small in comparison to the time constants of the phase impedance TPH=L/R and therefore the currents and voltages in the motor still extend in an approximately congruent manner. In practice, however, these idealized ratios are not automatically produced. Thus, it must be taken into consideration that, depending on motor characteristic variables and the maximum rotational speed that is to be considered, the motor position angle window can become smaller than 120° and, in addition, can become dependent upon the direction of rotation, as is illustrated in FIGS. 2a and 2b. The boundary values of the motor position angle windows are to be dimensioned for the specific application. However, this does not cause any changes in the fundamental method of switching off inductive loads within the predefined motor position angle window.

The motor position angle windows $\varphi_U$, $\varphi_V$, $\varphi_W$ for the switching off process are unfortunately not the same for each application. The rotation of the motor shaft, which rotation is produced from outside, does in fact always generate the three induced voltages with the sine-wave shaped progressions that are displaced with respect to one another by in each case 120° corresponding to a three phase system for a three phase brushless electric motor 1 and these then lead, as a consequence, to the buildup of current peaks. However, these current peaks do not extend in a congruent manner with respect to the induced voltages but rather suffer as a result of the complex impedance of the motor phases U, V, W firstly a time delay and secondly a distortion in form as a result of the external boundary condition with the short circuit in the AC converter 3. Furthermore, the current peaks expand with the increasing motor rotational speed N and the motor position angle windows $\varphi_U$, $\varphi_V$, $\varphi_W$ become correspondingly smaller. Finally, the process of determining the motor position angle windows $\varphi_U$, $\varphi_V$, $\varphi_W$ is a measuring task that takes into consideration the characteristic values of the electric motor being used and also the maximum rotational speed N that is to be considered. The amount of energy that is admissible for the power semiconductor switches 2 is also a criterion: the greater this amount of energy, the greater the short-term value of the phase current that can still exist during the switching off process, which is useful when maximizing the motor position angle window $\varphi_U$, $\varphi_V$, $\varphi_W$.

In FIGS. 2a and 2b, the idealized ratios in the case of a motor having a very small ratio of phase inductivity to phase resistance are illustrated as black continuous blocks. In these ideal conditions, the motor position angle window $\varphi_U$ for the winding U amounts to from 300° to 60°, for the winding V corresponding to the motor position angle window $\varphi_V$ from 60° to 180° and for the winding W motor position angle window $\varphi_W$ from 180° to 300°. This includes the previously briefly described principle abbreviations of the motor position angles $\varphi_U$, $\varphi_V$, $\varphi_W$ for motors having a high L/R ratio and high rotational speeds are illustrated here as shaded blocks.

An illustration corresponding to FIG. 1 is selected in FIG. 3. The electric motor 1 is actuated by the converter 3 by the switches 5, illustrated as a common block in FIG. 3, being opened or closed. The power semiconductor switches 2 are arranged between the switches 5 and the windings U, V, W of the electric motor 1. As already explained with reference to FIGS. 1 and 2, the power semiconductor switches 2 are opened as a function of the motor position angles $\varphi_U$, $\varphi_V$, $\varphi_W$ in the event of a fault. In the case of these previously known arrangements, the position angle sensor 6 does not supply its output signals to the microcontroller 4. The microcontroller 4 actuates the power semiconductor switches 2.

In the event of a conductively defective switch 5 in the AC converter 3 there is the risk of the microcontroller 4 also being destroyed as a result of the fault. So that the microcontroller 4 can always open the power semiconductor switches 2 safely in the event of a defective switch 5 in the AC converter 3, complex decoupling between the AC converter 3 and the microcontroller 4 is necessary.

The inventive idea is therefore that the power semiconductor switches 2 are no longer actuated by the microcontroller 4 but instead directly by the motor position angle sensor 6 and switch drive circuit 20. Therefore, in the case of the device illustrated in FIG. 4, the signals for reliably opening the power semiconductor switches 2 are generated directly from switch drive circuit 20 in response to an output of the motor position angle sensor 6. This is particularly advantageous since all of the information which is necessary for the safe opening of the power semiconductor switches 2, such as the motor position angle φ, motor speed and direction of rotation, is already present in this motor position angle sensor 6.

The idea which is essential to the invention is that the initiative for the opening of the power semiconductor switches 2 no longer lies with the microprocessor 4 but instead with the motor position angle sensor 6 which provides the motor angle and the motor speed. This solution is independent of the microprocessor 4 and can therefore be integrated very cost-effectively into a system which provides the motor angle and the motor speed.

As the motor rotational speed increases, the angle window for safely opening the power semiconductor switches 2 becomes smaller and in addition the higher rotational speed of the electric motor 1 means that the angle window which becomes smaller is also passed through more quickly. For this reason, at very high rotational speeds very precise signals with short latency times are necessary for safe opening of the power semiconductor switches 2, with the result that at the time of opening of the power semiconductor switches 2 only very small or negative motor currents are ever present. The generation of the signals for the opening of the power semiconductor switches 2 directly from switch drive circuit 20 in response to an output of the motor position angle sensor 6 which provides the motor angle and the motor speed is therefore very advantageous since this arrangement permits an extremely high update rate with a very short processing time. The very short processing time is achieved in particular by virtue of the fact that the motor angle information and motor speed information does not have to be transmitted to the microprocessor 4.

Safe opening of the power semiconductor switches 2 in the case of direct actuation from the motor position angle sensor 6 which provides the angle is therefore possible at higher rotational speeds than would be possible with actuation from the microprocessor 4.

Figure 4:
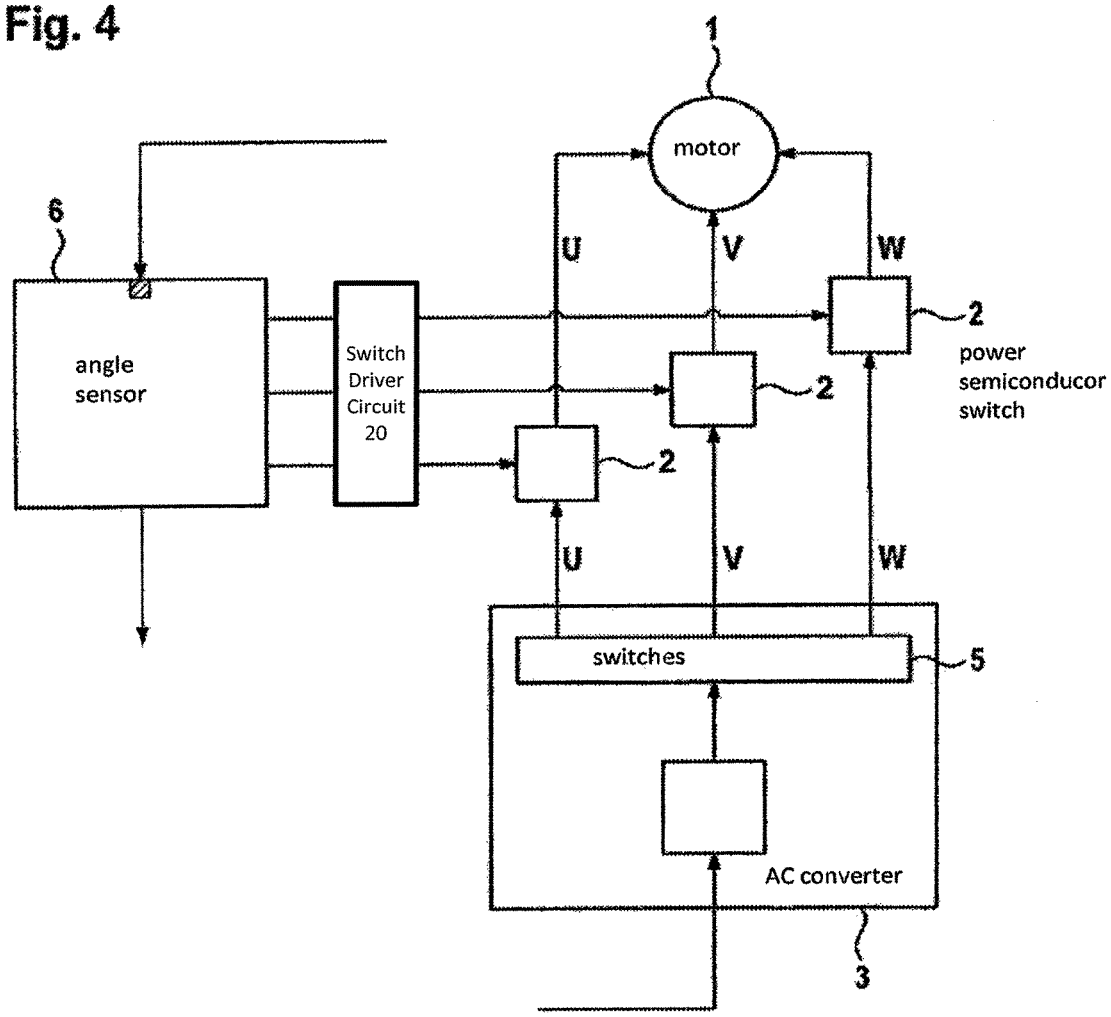
FIG. 4 illustrates a schematic diagram of the device in accordance with the invention.
Figure 5:
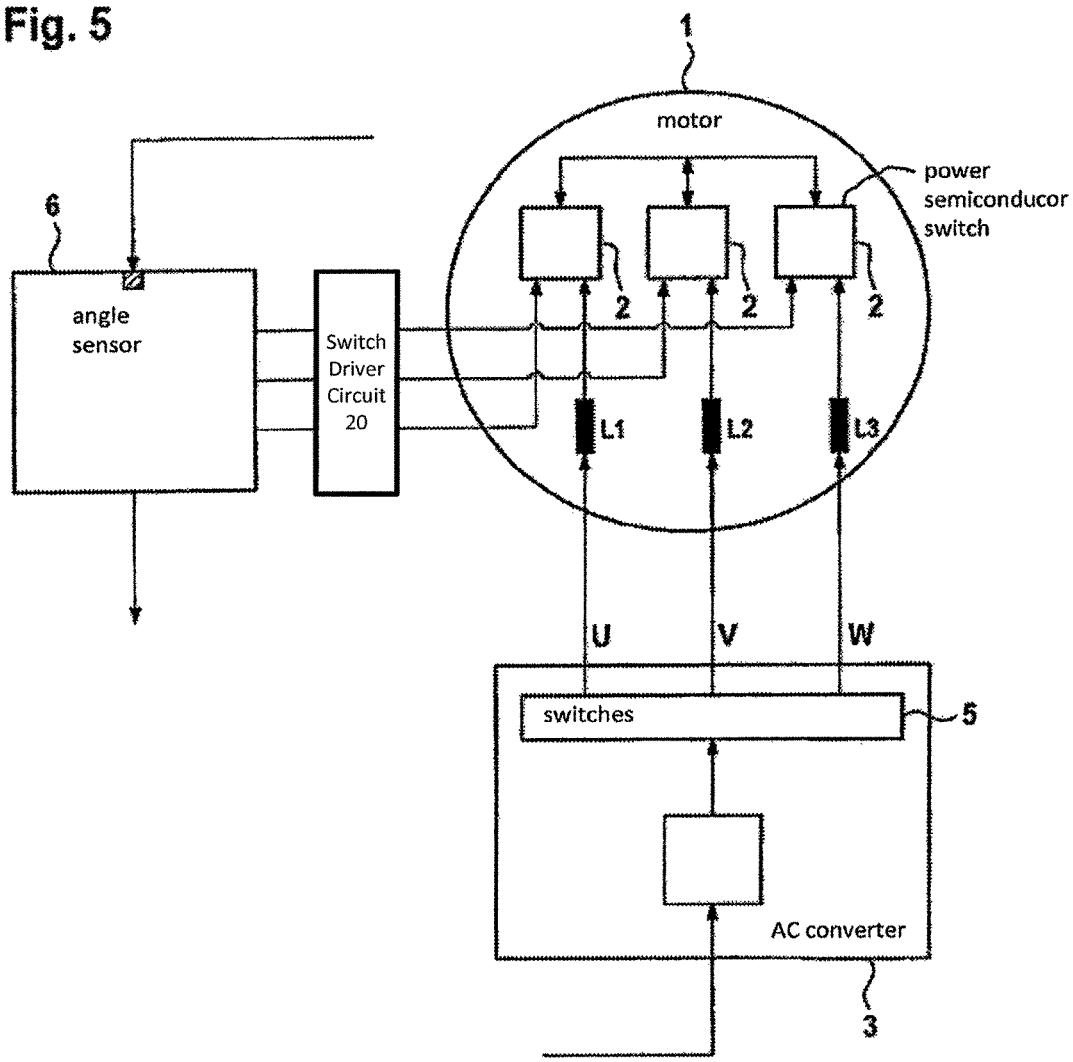
FIG. 5 illustrates a schematic circuit diagram of a second exemplary embodiment.

FIG. 5 illustrates a second embodiment that comprises a topology of the power semiconductor switches 2 as a "star-point switch": The power semiconductor switches 2 are in turn embodied as power MOSFET transistors and connect the end connectors of the motor phases U, V, W to the "star point". The use of the motor position angle φ for individually switching off the power semiconductor switches 2 within the suitable motor position angle windows $\varphi_U$, $\varphi_V$, $\varphi_W$ remains unchanged in comparison with the embodiment that is illustrated in FIG. 4.

The application of the described method renders possible the use of power semiconductor switches 2 as a safety characteristic in a system for operating a brushless electric motor 1, even if the maximum possible amount of inductive energy that occurs by virtue of the magnitude of the motor inductances and currents of a system of this type exceeds the absorption capacity of the available and/or economically justifiable power semiconductor switches. It is consequently possible to avoid the use of a mechanical relay that is not desired for various reasons: due to wear characteristics, sensitivity to moisture, changing contact characteristics and a lack of reliability etc., and it is possible to use the sometimes also more preferred solution owing to its construction using power semiconductor switches without having to introduce additional switching means for external energy absorption such as suppressor diodes or devices for measuring current.

The invention claimed is:

1. A method for operating a brushless electric motor with an AC converter comprising three outputs that are allocated to the windings (U, V, W) of the electric motor, a respective power semiconductor switch arranged between each output of the AC converter and the windings (U, V, W) of the brushless electric motor, a plurality of supply voltage switches, a detection unit, a measuring unit, a motor position angle sensor, and a switch driver circuit connected to an output of the motor position angle sensor, the method comprising:
   detecting, by the detection unit, a defective switch of the plurality of supply voltage switches,
   measuring, by the measuring unit, the voltage at the outputs of the AC converter,
   determining, by the motor position angle sensor, the motor position angle (φ), and
   performing the following steps sequentially:
      controlling all of the plurality of supply voltage switches to switch off following the detection of the defective switch so that power is no longer introduced into the windings (U, V, W) of the electric motor, and then
      while all of the plurality of supply voltage switches are switched off, generating and directly applying, by the switch driver circuit in response to an output signal of the motor position angle sensor, control signals to control the power semiconductor switches to individually switch off in succession at previously defined motor position angles (φU, φV, φW) respectively, the previously defined motor position angles (φU, φV, φW) are defined to prevent electric current generated by rotation of the electric motor from flowing to the plurality of supply voltage switches.

2. The method as claimed in claim 1, wherein the motor position angles (φU, φV, φW) are allocated in each case to a winding (U, V, W) and to the power semiconductor switch thereof and are selected so that the allocated power semiconductor switches are not damaged during the opening process.

3. The method as claimed in claim 1, wherein the motor position angles (φU, φV, φW) are selected so that the drain current (ID) prevailing at the power semiconductor switches is zero or almost zero.

4. The method as claimed in claim 1, wherein the motor position angles (φU, φV, φW) are selected so that the drain current (ID) prevailing at the power semiconductor switches is negative.

5. The method as claimed in claim 1, wherein the motor position angles (φU, φV, φW) are not dependent upon the position of the defective switch and are defined solely in dependence upon the rotation direction of the electric motor.

6. A device for operating a brushless electric motor comprising:
   an AC converter including three outputs that are allocated to the windings (U, V, W) of the electric motor;
   a respective power semiconductor switch arranged between each output of the AC converter and the windings (U, V, W) of the brushless electric motor;
   a plurality of supply voltage switches;
   a detection unit for detecting a defective switch of the plurality of supply voltage switches;
   a measuring unit for measuring the voltage at the outputs of the AC converter; and
   a motor position angle sensor for determining the motor position angle (φ); and
   a switch driver circuit connected to an output of the motor position angle sensor;
   wherein the following steps are performed sequentially:
      all of the plurality of supply voltage switches are switched off after the detection of the defective switch so that power is no longer introduced into the windings (U, V, W) of the electric motor, and then
      while all of the plurality of supply voltage switches are switched off, the switch driver circuit, in response an output signal of the motor position angle sensor, generates and directly applies control signals to control the power semiconductor switches to individually switch off in succession at previously defined motor position angles (φU, φV, φW) respectively, the previously defined motor position angles (φU, φV, φW) are defined to prevent electric current generated by rotation of the electric motor from flowing to the plurality of supply voltage switches.

7. The device as claimed in claim 6, wherein the motor position angle sensor is designed so as to allocate the motor position angles (φU, φV, φW) in each case to a winding (U, V, W) and the power semiconductor switch of said winding and to select said motor position angles so that the allocated power semiconductor switches are not damaged during the opening process.

8. The device as claimed in claim 6, wherein the motor position angle sensor is designed so as to select the motor position angles (φU, φV, φW) so that the drain current (ID) that is prevailing at the power semiconductor switches is zero, almost zero or negative.

9. The device as claimed in claim 6, wherein the power semiconductor switches are embodied as power MOSFET transistors.

10. The device as claimed in claim 6, wherein the unit for detecting defective switches and the unit for measuring the voltage at the outputs of the AC converter are integrated into the microcontroller.

* * * * *